United States Patent [19]

Kato et al.

[11] 4,266,256
[45] May 5, 1981

[54] CLEANER RIBBON FOR MAGNETIC TAPE

[75] Inventors: Katsuhiko Kato, Hiratsuka; Tosaku Kojima, Yokohama, both of Japan

[73] Assignee: Hitachi, Ltd., Japan

[21] Appl. No.: 918,271

[22] Filed: Jun. 22, 1978

[30] Foreign Application Priority Data

Jun. 24, 1977 [JP] Japan .................. 52-74345

[51] Int. Cl.³ .................. G11B 5/41; G11B 23/50; G11B 3/58
[52] U.S. Cl. .................. 360/128; 15/210 R; 360/137
[58] Field of Search .................. 360/128, 137, 130.2, 360/130.21; 15/97 R, 100, 256.5, 210 R; 51/135 R, 398, 400–402; 226/93, 95, 96; 242/182

[56] References Cited

U.S. PATENT DOCUMENTS

| | | | |
|---|---|---|---|
| 3,266,196 | 8/1966 | Barcaro | 360/137 |
| 3,731,289 | 5/1973 | Bajgert et al. | 360/128 |
| 3,756,610 | 9/1973 | Naegele et al. | 360/130.21 |
| 3,823,947 | 7/1964 | Sasaki et al. | 360/128 |
| 4,004,314 | 1/1977 | Post et al. | 360/137 |
| 4,096,538 | 6/1978 | Oishi | 360/130.21 |
| 4,138,229 | 2/1979 | Tadokoro et al. | 360/128 |

FOREIGN PATENT DOCUMENTS

| | | | |
|---|---|---|---|
| 2301533 | 8/1974 | Fed. Rep. of Germany | 360/128 |
| 2441755 | 3/1975 | Fed. Rep. of Germany | 360/128 |

*Primary Examiner*—Alfred H. Eddleman
*Attorney, Agent, or Firm*—Craig & Antonelli

[57] ABSTRACT

When a composite material comprising a nylon non-woven fabric as a substrate and a paper material for cleaning a magnetic tape which has been stuck onto one surface or both surfaces of said nylon non-woven fabric is used as a ribbon used in a tape cleaning device for cleaning a magnetic tape and/or for cleaning a magnetic converter or a magnetic head for sending a magnetic tape, a decrease in a reproduction output due to static charge can be prevented, the generation of dust and the damage of the tape can be decreased, and a cleaning effect for the magnetic tape and/or the magnetic head can be improved.

8 Claims, 12 Drawing Figures

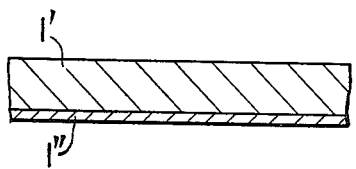
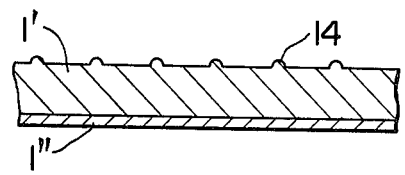
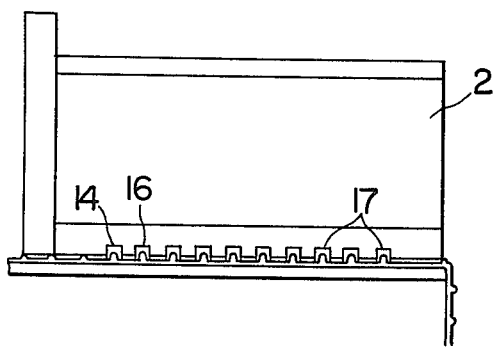
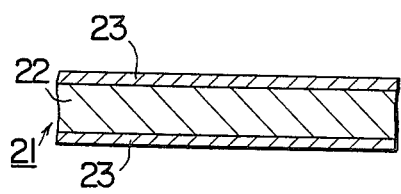
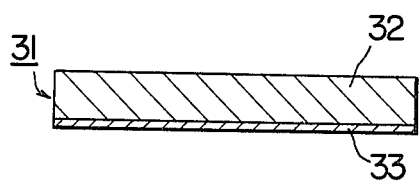

DUST-STUCK STATE ON MAGNETIC TAPE SIDE OF PRIOR ART CLEANER RIBBON
(NYLON WOVEN FABRIC)

DUST-STUCK STATE ON MAGNETIC TAPE SIDE OF IMPROVED CLEANER RIBBON ACCORDING TO THE PRESENT INVENTION
(JAPANESE PAPER)

CLEANER RIBBON FOR MAGNETIC TAPE

BACKGROUND OF THE INVENTION

The present invention relates to a cleaner ribbon for a magnetic tape.

Various mechanisms for sending a magnetic tape are put to practical use. A means for shifting the oxide conversion surface of the magnetic tape and passing the tape through a magnetic converter or a magnetic head, for example, a means using a capstan, a means for reading or recording data and a means for deviating the magnetic tape dynamically and forcibly with regard to said magnetic head are provided in all the constructions.

During the reading and recording treatment by such a means, the oxide of the magnetic tape and foreign substances such as dust are easy to be collected on the surface of the magnetic head. This dust collecting action soils the head and reduces the conversion action on the head-tape interface.

In order to solve such a problem, a half measure of interrupting the feed of the tape at regular intervals to polish the surface of the head manually and clean with a solvent has been used. Such a manual means has defects in that the interruption of the feed of the tape results in a loss of time and manual cleaning becomes non-uniform owing to individual difference, etc.

Various measures have heretofore been proposed to obviate such defects. For example, a measure of replacing a magnetic tape by a cleaner tape, a measure of using a magnetic tape which itself has the same length as a cleaner tape, etc. have been proposed. Further, a measure of shifting the head periodically so that the head may be released from working with the tape to be cleaned and a measure of allowing a wiper or brush specially designed for the cleaning of the head periodically to act on the head have been proposed. Such previously known automatic head cleaning measures have not required manual labor but have cleaned the tape by removing the tape from the head periodically.

It has also been proposed to carry out the cleaning of a magnetic tape and a magnetic head with a cleaner tape automatically as shown in FIG. 1 in the accompanying drawings in order to improve the cleaning action.

FIG. 1 shows one example of the arrangement of an automatic head/tape cleaning device 10. FIG. 2 is an enlarged view of a head/tape cleaning part in FIG. 1. In FIG. 1, a cleaner ribbon 1 is supplied from a supply reel 4 and sent to the head/tape cleaning part as shown in FIG. 2 through a roller 6. Then, the cleaner ribbon 1 enters a capstan roller 7. A capstan 7 rotates on a shaft 12 through a roller 8 by a frictional force. The cleaner ribbon 1 then enters the roller 8. A motor 9 connected to the roller 8 gives a driving force to the roller 8. A winding roller 5 is driven by a belt 13 through the roller 8 and winds up the cleaner ribbon 1, and 11 is a shaft common to the reels 4 and 5. FIG. 3 shows a prior art cleaner ribbon 1 consisting of a nylon woven fabric 1. Returning to FIG. 1, the cleaner ribbon 1 extends across a transferrer of a magnetic tape 3 and encloses the magnetic tape 3 in the length direction as shown in FIG. 1. The full line part of the cleaner ribbon 1 in FIG. 2 shows the ribbon arranged at a nonworking position, and the broken line part shows the ribbon arranged at a working position. In the latter case, the cleaner ribbon 1 enters between the head and the tape and is arranged at such a position as the magnetic tape 3 is separated from the magnetic head 2.

The cleaning of a magnetic tape with the cleaner ribbon 1 has defects in that, since the head/tape cleaning device moves and carries out cleaning on high speed rewinding or on automatic loading, the cleaner ribbon 1 made of a nylon woven fabric rubs violently against an organic binder in the magnetic layer of the magnetic tape 3, causing an obstacle due to static charge, and the magnetic layer of the magnetic tape is damaged by the edge 15 of the nylon woven fabric 1 shown in FIG. 3, producing worn-out powder.

SUMMARY OF THE INVENTION

The present invention relates to a cleaner ribbon. More particularly, the invention pertains to a cleaner ribbon suitable for the cleaning of a magnetic tape and/or the cleaning of a magnetic converter or a magnetic head for sending the magnetic tape.

An object of the present invention is to provide a cleaner ribbon wherein the above-mentioned defects of prior art have been obviated.

Another object of the invention is to provide a magnetic head/magnetic tape cleaning element which decreases obstacle due to static charge and wear of a magnetic tape in a head/tape cleaning device.

In order to accomplish these objects, according to the present invention, a composite material comprising a nylon non-woven fabric as a substrate and a paper material for cleaning a magnetic tape which has been stuck with an adhesive onto the surface of said substrate adjoining the magnetic tape. Also, in the nylon non-woven fabric in the composite cleaner ribbon, a plurality of projections fitting the track grooves of the magnetic head may be provided.

Another embodiment of the present invention is that a paper tape for cleaning a magnetic tape is stuck onto the surfaces of a cleaner ribbon adjoining the magnetic head and the magnetic tape, respectively, with a polyethylene adhesive having excellent chemical resistance, which adhesive is interposed between the paper tape and the cleaner ribbon to form a three-layer composite material.

Therefore, a further object of the present invention is to provide a composite cleaner ribbon comprising a synthetic fiber non-woven fabric backed with a paper material wherein the side of the cleaner ribbon adjoining a magnetic head consists of the synthetic non-woven fabric and the side of the cleaner ribbon adjoining a magnetic tape consists of the paper material.

BRIEF DESCRIPTION OF THE DRAWINGS

In the accompanying drawings,

FIGS. 4 and 5 show improved cleaner ribbons according to the present invention.

FIG. 6 shows an improved cleaner ribbon according to the present invention which has been set at the magnetic head portion of a magnetic tape apparatus.

FIG. 7 shows another improved cleaner ribbon according to the present invention.

FIG. 8 shows another improved cleaner ribbon according to the present invention.

DESCRIPTION OF THE PREFERRED EMBODIMENTS

Figure 1:
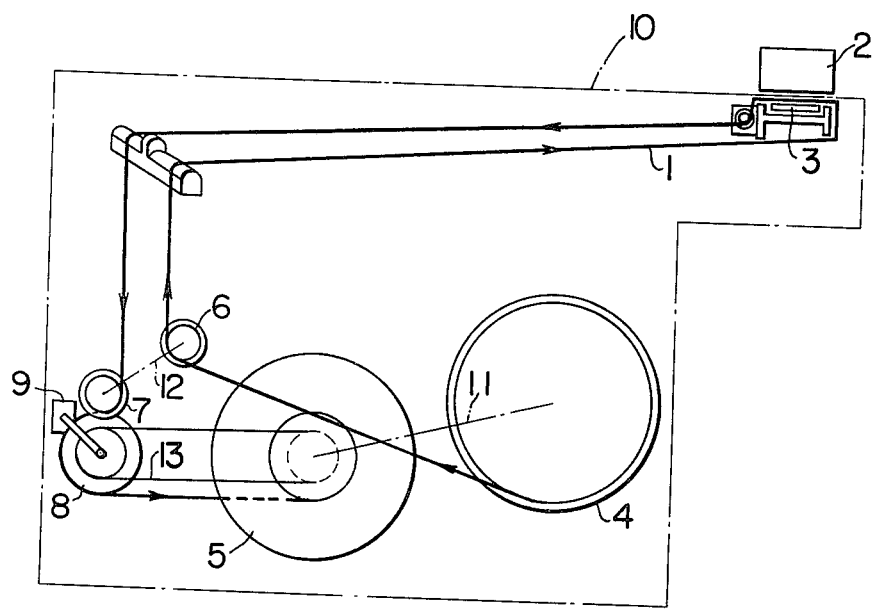
FIG. 1 shows the constitution of a typical automatic magnetic head/magnetic tape cleaning device.
Figure 2:
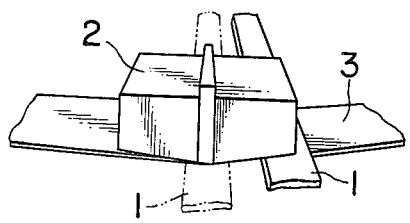
FIG. 2 is a part drawing of the automatic magnetic head/magnetic tape cleaning device as shown in FIG. 1.
Figure 3:
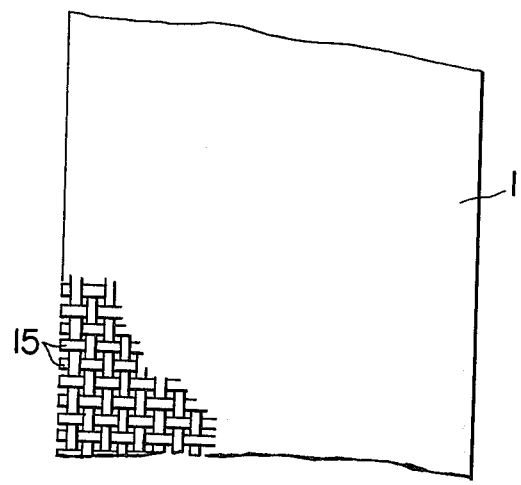
FIG. 3 shows a prior art cleaner ribbon.

Referring to the accompanying drawings, the present invention will be explained in more detail. An embodiment of the present invention is shown in FIG. 4. In FIG. 4, the cleaner ribbon is a composite material consisting of a two-layer structure obtained by sticking a nylon non-woven fabric 1' onto a dusting fabric for tape cleaning 1" comprising a paper material and containing no substance which deteriorates with the lapse of time, with a polyethylene adhesive having excellent resistance to acids and alkalis being used to stick the nylon non-woven fabric onto the dusting fabric.

The reasons why a nylon non-woven fabric is used as a substrate are that the problem of static charge with a magnetic tape 3 is removed and the nylon non-woven fabric is excellent in property of burying dust, etc. therein. The dusting fabric is selected as a backing for the nylon non-woven fabric in order to decrease its static charging property.

By the use of this cleaner ribbon, the generation of dust and the damage of a magnetic tape can be prevented even if the magnetic tape contacts with an edge of nylon fiber. Also, since the dusting fabric 1" consists of a soft paper material, the damage of the magnetic tape 3 can be decreased even on high speed moving of the magnetic tape and the cleaning effect for the magnetic tape can unexpectedly be improved.

Another embodiment of the present invention is shown in FIG. 5. As is clear from FIG. 5, a plurality of projections 14 fitting the track grooves of a magnetic head are provided on the surface of a nylon non-woven fabric 1" as a substrate adjoining a magnetic head. The surface of the substrate opposite to the surface having the projections 14 is backed by a dusting fabric 1" in the same manner as in the above-mentioned embodiment. FIG. 6 shows the cleaner ribbon for cleaning a magnetic tape according to the present invention which has been set at the magnetic head portion of a magnetic tape apparatus. FIG. 6 shows that the dust 17 which has collected in the track grooves 16 of a magnetic head 2 and which is difficult to remove can be wiped off by the projections 14 of the cleaner ribbon 1. As in the above-mentioned embodiment, it is further possible to decrease the problem due to static charge with a magnetic tape 3 and to decrease wear of the magnetic tape.

The sending speed of the head/tape cleaning device is usually 2 mm per minute and a high speed rewinding time is about 45 seconds. Therefore, the pulsation due to contact of the projections of a cleaner ribbon with the track grooves of a magnetic head causes practically no trouble.

Another embodiment of the present invention is shown in FIG. 7. In FIG. 7, a cleaner ribbon 21 is a composite material consisting of a three-layer structure obtained by sticking a paper material 23 for cleaning a tape, containing no substance which degrades with the lapse of time, onto the surfaces adjoining a magnetic tape and a magnetic head, respectively, of a synthetic fiber non-woven fabric 22 as a substrate, the paper material being stuck to the synthetic fiber non-woven fabric with a polyethylene adhesive having excellent chemical resistance. The use of such a cleaner ribbon prevents the generation of dust and the damage of a magnetic tape which has been caused by contact with the edge of a nylon woven fabric comprising short fiber in prior art cleaner ribbons. Also, even on the high speed moving of a magnetic tape 3, no problem due to static charge occurs and the damage of the magnetic tape can be decreased owing to the softness of the paper material for tape cleaning. Further, cleaning effect for the magnetic tape and the magnetic head can unexpectedly be improved.

Another embodiment of the present invention is shown in FIG. 8. In FIG. 8, a cleaner ribbon 31 is a composite material consisting of a two-layer structure obtained by sticking a paper material 33 onto a synthetic fiber non-woven fabric substrate 32 with a polyester adhesive having excellent chemical resistance. In this composite material, the synthetic fiber non-woven fabric 32 is thicker than the paper material 33. When a tension is applied to the composite ribbon as set in the head/tape cleaning device 10 shown in FIG. 1, the ribbon is bent with the non-woven fabric surface 32 inside in the width direction and inserted under the head 2 so that the ribbon may contact with the magnetic head along the curved surface thereof. Therefore, dust can uniformly be wiped off by the whole surface of the paper material 33 except the edge thereof in the composite cleaner ribbon. Since the edge does not contact the magnetic tape, the generation of dust by the edge can be prevented and the damage of a magnetic tape can be decreased. The object of using a paper material as a backing for a synthetic fiber is to decrease static charging tendency. Also, even on the high speed moving of a magnetic tape, the damage of the magnetic tape can be decreased since a paper material is softer than a nylon woven fabric in prior art. A cleaning effect can unexpectedly be improved as compared with the prior art.

Figure 9:
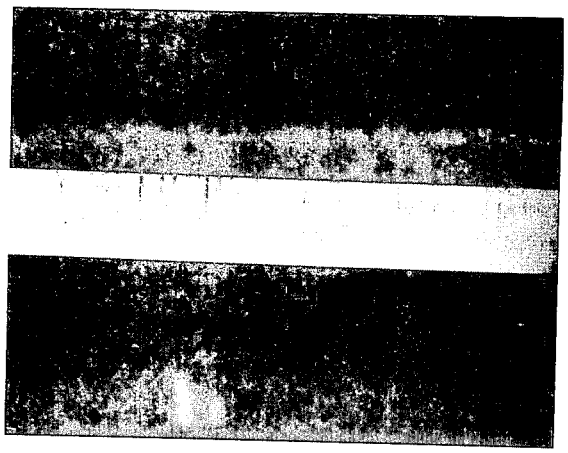
FIG. 9 is a photograph showing the dust stuck on the magnetic tape side of a prior art cleaner ribbon.
Figure 10:
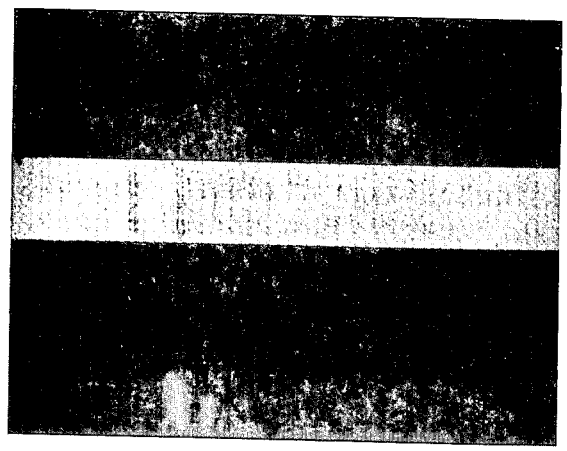
FIG. 10 is a photograph of the dust stuck on the magnetic tape side of an improved cleaner ribbon according to the present invention.

For example, in the case of a two-layer composite cleaner ribbon according to the present invention prepared by the use of a nylon non-woven fabric as a substrate and a Japanese paper, the amount of the dust deposited on the magnetic tape side of the composite cleaner ribbon was 60 to 270 $\mu$g per 60×12.7 mm (FIG. 10). On the other hand, the amount of the dust deposited on the magnetic tape side of a prior art cleaner ribbon consisting of a nylon woven fabric was 20 to 50 $\mu$g per 60×12.7 mm (FIG. 9).

Figure 11:
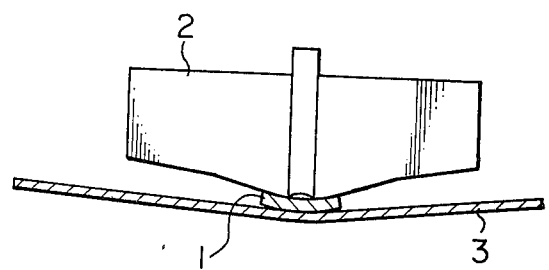
FIG. 11 shows a cleaner ribbon according to the present invention which has been inserted under a magnetic head to clean the head and/or a magnetic tape.
Figure 12:
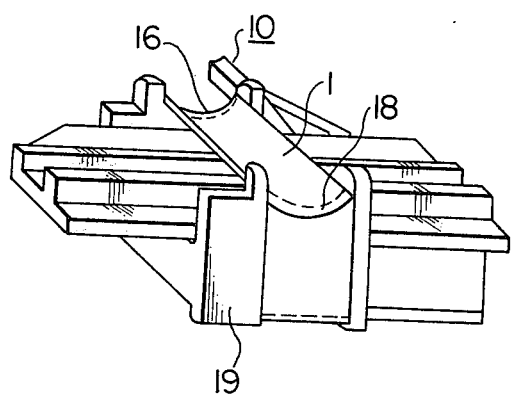
FIG. 12 shows a ribbon guide for providing a cleaner ribbon according to the present invention with the same curvature as that of the head part of a magnetic head.

As described above, the cleaner ribbon of the present invention 1 contacts with a magnetic head 2 along the curved surface of the head 2, as shown in FIG. 11, when the cleaner ribbon 1 is inserted under the head 2 under a tension applied to the ribbon 1 as set in a head/tape cleaning device 10 in the length direction of the ribbon 1. In this case, if the cleaner ribbon 1 is supported by a ribbon guide 19 and a ribbon side sliding part 18 provided in the head/tape cleaning device 10 as shown in FIG. 12 and the ribbon side sliding part 18 is provided with such a curved surface as shown in FIG. 12, the cleaner ribbon 1 can maintain the curved state of the ribbon 1 and can contact with the curved surface of the head 2 completely. As a result, the generation of dust by the edge of the ribbon 1 and the damage of a magnetic tape 3 can be prevented and a cleaning effect can be improved as compared with the prior art head/tape cleaning device.

As explained above in detail, a decrease in a reproduction output due to static charge can be prevented, the generation of dust and the damage of the tape can be decreased, and a cleaning effect for a magnetic tape and/or a magnetic head can be improved by using a nylon non-woven fabric backed by a dusting fabric as a cleaner ribbon according to the present invention.

What is claimed is:

1. A cleaner ribbon for a magnetic tape used in a head/tape cleaning device in a magnetic tape apparatus which consists of a composite material comprising a nylon non-woven fabric as a substrate which has a plurality of projections, adapted to fit the track grooves of a magnetic head, on its surface adjoining the magnetic head and which has a paper material layer attached onto the surface of said substrate opposite to the surface having the projections, said paper material being attached to said surface of said substrate with an adhesive, said paper material being a material capable of cleaning said magnetic tape.

2. A cleaner ribbon for a magnetic tape according to claim 1, wherein the paper material is a dusting fabric.

3. A cleaner ribbon for a magnetic tape used in a head/tape cleaning device in a magnetic tape apparatus which consists of a composite three-layer structure comprising a nylon non-woven fabric as a substrate and a paper material layer attached onto each of the opposite surfaces of said substrate and adapted to adjoin the magnetic tape and a magnetic head, respectively, said paper material attached to the surfaces of the substrate with a polyethylene adhesive, said paper material being a material capable of cleaning said magnetic tape.

4. A cleaner ribbon for a magnetic tape according to claim 3, wherein the paper material is a dusting fabric.

5. A cleaner ribbon for a magnetic tape used in a head/tape cleaning device in a magnetic tape apparatus which consists of composite material comprising a nylon non-woven fabric substrate which has a plurality of projections adapted to fit the track grooves of a magnetic head, on the fabric surface adapted to adjoin the magnetic head, and a paper material layer attached onto the other surface of said substrate with a polyethylene adhesive, said paper material being a material capable of cleaning said magnetic tape.

6. A cleaner ribbon for a magnetic tape according to claim 5, wherein the paper material is a dusting fabric.

7. A cleaner ribbon for a magnetic tape used in a head/tape cleaning device in a magnetic tape apparatus, consisting of a composite material comprising a nylon non-woven fabric substrate which has a plurality of projections adapted to fit the track grooves of a magnetic head, on the fabric surface adapted to adjoin the magnetic head, and a dusting fabric paper material layer attached to the other surface of said substrate with a polyester adhesive having excellent resistance to acids and alkalis, said dusting fabric paper material being a material which acts to clean said magnetic tape.

8. A cleaner ribbon for a magnetic tape according to claim 7, wherein said paper material is a Japanese paper.

* * * * *